(12) United States Patent
Stillo et al.

(10) Patent No.: US 9,709,158 B2
(45) Date of Patent: Jul. 18, 2017

(54) ANTI-BACKLASH GEAR CONTROL DEVICE

(71) Applicant: Raytheon Company, Waltham, MA (US)

(72) Inventors: Phillip Stillo, Waltham, MA (US); Michael F. Turk, Waltham, MA (US)

(73) Assignee: Raytheon Company, Waltham, MA (US)

( * ) Notice: Subject to any disclaimer, the term of this patent is extended or adjusted under 35 U.S.C. 154(b) by 469 days.

(21) Appl. No.: 13/801,570

(22) Filed: Mar. 13, 2013

(65) Prior Publication Data

US 2014/0053672 A1   Feb. 27, 2014

Related U.S. Application Data

(60) Provisional application No. 61/693,682, filed on Aug. 27, 2012.

(51) Int. Cl.
*F16H 57/12* (2006.01)

(52) U.S. Cl.
CPC ....... *F16H 57/12* (2013.01); *F16H 2057/122* (2013.01); *Y10T 74/19623* (2015.01)

(58) Field of Classification Search
CPC .................................................. G05B 19/404
USPC .............................................. 318/8, 18, 630
See application file for complete search history.

(56) References Cited

U.S. PATENT DOCUMENTS

| | | | | |
|---|---|---|---|---|
| 3,833,847 A | | 9/1974 | Kelling | |
| 4,325,015 A | * | 4/1982 | Heiberger | H02P 5/69 318/10 |
| 4,710,880 A | * | 12/1987 | Zuber | B61L 25/021 246/182 C |
| 5,047,703 A | * | 9/1991 | Akamatsu | G05B 19/237 318/48 |
| 5,134,346 A | * | 7/1992 | Schneider | B23H 7/26 318/13 |
| 5,430,361 A | * | 7/1995 | Wells | F16H 57/12 318/625 |
| 2009/0237026 A1 | * | 9/2009 | Panaitescu | G05B 19/404 318/630 |
| 2010/0181955 A1 | * | 7/2010 | Maeda | G05B 19/404 318/625 |

* cited by examiner

*Primary Examiner* — Shawki S Ismail
*Assistant Examiner* — Muhammad S Islam

(57) ABSTRACT

An anti-backlash gear control device is disclosed that includes a first bias module operable to generate a first bias to be applied to a first motor operable with a first gear, and a second bias module operable to generate a second bias, opposite the first bias, to be applied to a second motor operable with a second gear. The first gear and the second gear are operably connected to a load gear, such that rotation of at least one of the first gear and the second gear causes the load gear to move. Additionally, a command module can receive a drive command and output at least one of first and second command signals based on the drive command to be summed with the first and second biases, respectively, to generate first and second drive signals to operate the first and second motors to drive the first and second gears, respectively.

20 Claims, 1 Drawing Sheet

ANTI-BACKLASH GEAR CONTROL DEVICE

CROSS-REFERENCE TO RELATED APPLICATIONS

This application claims the benefit of U.S. Provisional Application Ser. No. 61/693,682, filed Aug. 27, 2012, and entitled "Anti-Backlash Gear Control Device," which is incorporated by reference herein in its entirety.

BACKGROUND

Gears are widely used in many mechanical devices. A typical gear comprises a rotating part having teeth that can mesh with teeth of another gear in order to transmit torque or force by contact between interface surfaces of the teeth. Oftentimes, however, a gap can exist between non-contacting interface surfaces of the teeth that allows a certain amount of "play" between the gears. Thus, when one gear changes direction or slows speed relative to the other gear, an audible noise can be heard when the gears move through the gap and strike one another. This play between the gears and resulting impact when contact is reestablished is known as "backlash." In motor driven systems, a bias tending to maintain one gear in contact with another gear can be applied in order to eliminate or reduce backlash.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Figure 1:
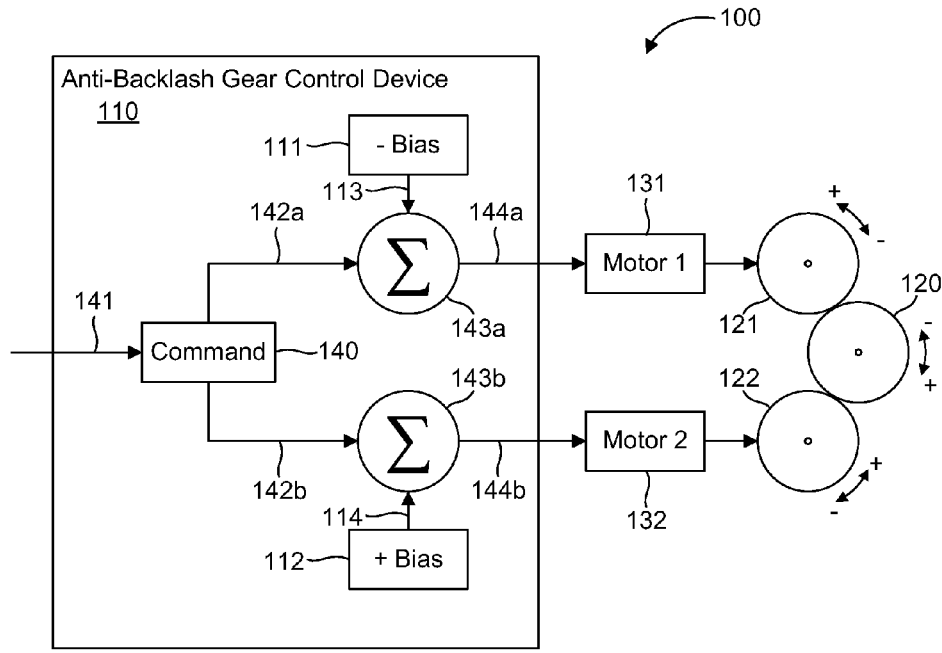
FIG. 1 is an example illustration of an anti-backlash gear system in accordance with an embodiment of the present invention.

Reference will now be made to the exemplary embodiments illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Although simply applying a bias to a gear can be effective in many operating conditions, the bias can be overcome and effectively eliminated in certain operating conditions, which can allow the impact and audible noise of backlash to occur. This can be undesirable in situations that require quiet operation of the gears. Thus, performance in such situations can be improved by eliminating or reducing backlash in gears where a simple bias would be ineffective.

Accordingly, an anti-backlash gear control device is disclosed that prevents overcoming a bias in order to eliminate or reduce backlash in gears. The anti-backlash gear control device can include a first bias module operable to generate a first bias to be applied to a first motor operable with a first gear. The anti-backlash gear control device can also include a second bias module operable to generate a second bias, opposite the first bias, to be applied to a second motor operable with a second gear. The first gear and the second gear are operably connected to a load gear, such that rotation of at least one of the first gear and the second gear causes the load gear to move. Additionally, the anti-backlash gear control device can include a command module operable to receive a drive command and output a command signal to be summed with at least one of the first bias and the second bias to control operation of the first motor and the second motor. The command module can output at least one of first and second command signals based on the drive command to be summed with the first and second biases, respectively, to generate first and second drive signals to operate the first and second motors to drive the first and second gears, respectively.

An anti-backlash gear system is also disclosed. The system can include a first motor operable to apply torque to a first gear, a second motor operable to apply torque to a second gear, and a load gear operably connected to the first gear and the second gear, such that rotation of at least one of the first gear and the second gear causes the load gear to move. The system can further include an anti-backlash gear control device. The anti-backlash gear control device can include a first bias module operable to generate a first bias to be applied to the first motor operable with the first gear, and a second bias module operable to generate a second bias, opposite the first bias, to be applied to the second motor operable with the second gear. In addition, the anti-backlash gear control device can include a command module operable to receive a drive command and output a command signal to be summed with at least one of the first bias and the second bias to control operation of the first motor and the second motor. The command module can output at least one of first and second command signals based on the drive command to be summed with the first and second biases, respectively, to generate first and second drive signals to operate the first and second motors to drive the first and second gears, respectively.

One embodiment of an anti-backlash gear system 100 is illustrated in FIG. 1. The system 100 can comprise an anti-backlash gear control device 110 operable to drive a load gear 120 via a first motor 131, a second motor 132, a first gear 121, and a second gear 122. The anti-backlash gear control device 110 can comprise a first bias module 111 operable to generate a first bias 113 to be applied to the first motor 131, which is operable with the first gear 121. The anti-backlash gear control device 110 can also comprise a second bias module 112 operable to generate a second bias 114, opposite the first bias 113, to be applied to the second motor 132, which is operable with the second gear 122. The first gear 121 and the second gear 122 can be operably connected to the load gear 120, such that rotation of at least one of the first gear 121 and the second gear 122 can cause the load gear 120 to move. Although the figure illustrates a load gear configured for rotational movement, it should be recognized that a load gear can also be configured as a non-rotating "rack" to produce translation instead of rotation. In addition, a load gear can comprise a ring gear or any other suitable type of gear.

The anti-backlash gear control device 110 can also comprise a command module 140 operable to receive a drive command 141 and output a command signal 142a, 142b to be summed at 143a, 143b with at least one of the first bias 113 and the second bias 114 to control operation of the first motor 131 and the second motor 132. In one aspect, the drive command can originate external to the anti-backlash gear control device 110, such as from an operator or a control device over movement and/or torque of the load gear 120. The command module 140 can output at least one of first and second command signals 142a, 142b, respectively, based on the drive command 141. The first and second command signals 142a, 142b can be summed with the first and second biases 113, 114, respectively, to generate first and second drive signals 144a, 144b to operate the first and second motors 131, 132 to drive the first and second gears 121, 122, respectively. When no drive command is received, the command signals 142a, 142b can be set to zero or not sent, with the result being that the first and second motors 131, 132 only apply their respective biases 113, 114 to the load gear 120.

In one aspect, a drive command 141 for movement of the load gear 120 in a negative direction can cause the command module 140 to output a first command signal 142a based on the drive command 141 to be summed with the first negative bias 113 to provide a first drive signal 144a configured to control operation of the first motor 131. Furthermore, the negative drive command 141 can cause the second drive signal 144b operable with the second motor 132 to equal the second positive bias 114 to bias the second gear 122 in contact with the load gear 120. A drive command 141 for movement of the load gear 120 in a positive direction can cause the command module 140 to output a second command signal 142b based on the drive command 141 to be summed with the second positive bias 114 to provide a second drive signal 144b configured to control operation of the second motor 132. Furthermore, the positive drive command 141 can cause the first drive signal 144a operable with the first motor 131 to equal the first negative bias 113 to bias the first gear 121 in contact with the load gear 120. Thus, in this case, each of the first and second motors 131, 132 can be driven only in the direction of its bias. This prevents a drive command from overcoming a bias, which can allow backlash to occur. For example, when the command module 140 determines that the load gear 120 needs to rotate in the positive direction, the command signal 142b is only applied to the second motor 132 with the positive bias 114. The first motor 131 maintains its negative bias 113 to ensure that no backlash occurs. An analogous situation applies for driving the load gear 120 in the negative direction. This mode of operation can be useful when quiet gear operation is desired. This mode of operation can also reduce power consumption, as only a single motor is used to drive the load gear 120 and the biases can be minimized or reduced to a maintain contact between the gears without excessive and unnecessary torque being applied by the motor.

In another aspect, the command module 140 can simultaneously output first and second command signals 142a, 142b based on the drive command 141 to be summed with the first and second biases 113, 114, respectively, to simultaneously operate the first and second motors 131, 132 to drive the first and second gears 121, 122, respectively. In other words, the same drive command can be summed with both biases to factor into the torque applied to the load gear 120 from both motors 131, 132. Depending on the drive command and the biases, the bias of one of the motors can be overcome and backlash can occur. This mode of operation facilitates use of both the first and second motors 131, 132 in the same direction to provide more torque than is available from using only a single motor. This can be useful in situations where quiet gear operation is less important than torque applied to the load gear 120.

Figure 2:
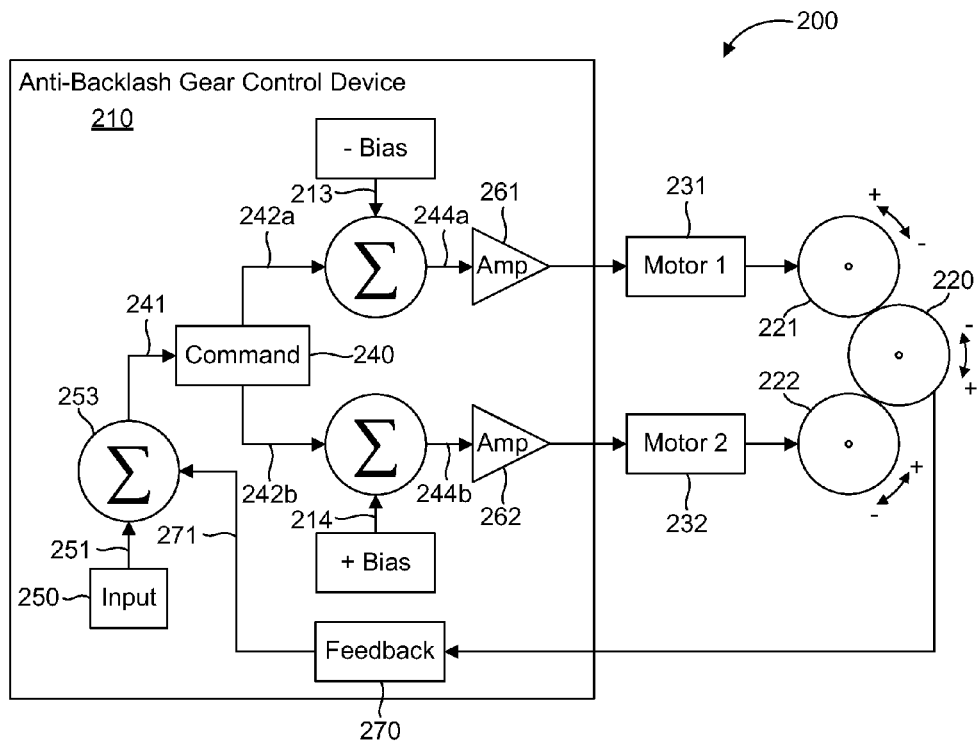
FIG. 2 is an example illustration of an anti-backlash gear system in accordance with another embodiment of the present invention.

With reference to FIG. 2, illustrated is an anti-backlash gear system 200. The system 200 is similar in many respects to the system illustrated in FIG. 1, and includes an anti-backlash gear control device 210 operable to drive a load gear 220 via first motor 231, second motor 232, first gear 221, and second gear 222. The anti-backlash gear control device 210 of the system 200, however, further includes an input module 250 to provide drive input 251 for the drive command 241. In one aspect, the input module 250 can receive input originating external to the anti-backlash gear control device 210. For example, the input module 250 can receive input from an operator or a control device over movement and/or torque of the load gear 220. The anti-backlash gear control device 210 of the system 200 can further include a feedback module 270 to provide feedback 271 from the load gear 220 to be summed at 253 with drive input 251. This can form a closed loop system, which may include nested loops, factoring parameters of the load gear 220, such as position, torque, or speed, into the drive command 241. The drive command 241 can therefore equal the summation of the drive input 251 and the feedback 271. Thus, for example, if there is no feedback, the drive command 241 can equal the drive input 251.

In another aspect, the system 200 can also include at least one amplifier 261, 262 configured to amplify one or more of the first and second drive signals 244a, 244b for the motors 231, 232. A digital drive signal can be converted to analog prior to the amplifiers 261, 262. As illustrated, the amplifiers 261, 262 are included in the anti-backlash gear control device 210. However, it should be recognized that one or both of the amplifiers 261, 262 can be separate from, or external to, the anti-backlash gear control device 210.

In one aspect, an anti-backlash gear control device can include electrical, mechanical, or electromechanical components. For example, the command module 240 can comprise a rectifier, such as a dual rectifier, or a switch to perform the functions of a command module described herein. In another aspect, any or all of the components of an anti-backlash gear control device can be controlled by machine readable instructions. For example, one or more of the input module, the command module, the first bias module, the second bias module, and the feedback module can be under control of a digital processor operable with suitable software and/or firmware. In other words, in some embodiments, any or all of the elements of the anti-backlash gear control device 210 can be computer controlled or executed by a computer.

In one embodiment, machine readable instructions can control one or more operating modes. For example, in a first operating mode, a negative drive command can cause the command module 240 to output the first command signal 242a based on the drive command 241 to be summed with the first bias 213 to provide the first drive signal 244a configured to control operation of the first motor 231. Additionally, a positive drive command 241 can cause the command module 240 to output a second command signal 242b based on the drive command 241 to be summed with the second bias 214 to provide the second drive signal 244b configured to control operation of the second motor 232. As described above, this mode of operation can be useful when quiet gear operation is desired, and can also reduce power consumption, as only a single motor is used to drive the load gear 220.

In a second operating mode, the command module 240 can simultaneously output first and second command signals 242a, 242b based on the drive command 241 to be summed with the first and second biases 213, 214, respectively, to simultaneously operate the first and second motors 231, 232 to drive the first and second gears 221, 222, respectively. As described above, this mode of operation facilitates use of both the first and second motors 231, 232 in the same direction, which can be useful to provide more torque than is available from using only a single motor.

In accordance with one embodiment of the present invention, a method for controlling backlash within a gear system is disclosed. The method can comprise applying a first bias to a first motor operable with a first gear. The method can further comprise applying a second bias, opposite the first bias, to a second motor operable with a second gear, wherein the first gear and the second gear are operably connectable to a load gear, such that rotation of at least one of the first gear and the second gear causes the load gear to rotate. The method can still further comprise receiving a drive command. The method can also comprise outputting at least one of first and second command signals based on the drive command to be summed with the first and second biases, respectively. Additionally, the method can comprise generating first and second drive signals to operate the first and second motors to drive the first and second gears, respectively. It is noted that no specific order is required in this method, though generally in one embodiment, these method steps can be carried out sequentially.

In one aspect of the method, a negative drive command causes outputting a first command signal based on the drive command to be summed with the first bias to provide a first drive signal configured to control operation of the first motor.

In another aspect of the method, a positive drive command causes outputting a second command signal based on the drive command to be summed with the second bias to provide a second drive signal configured to control operation of the second motor. In yet another aspect of the method, simultaneously outputting first and second command signals based on the drive command to be summed with the first and second biases, respectively, simultaneously operates the first and second motors to drive the first and second gears, respectively.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the foregoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. An anti-backlash gear control device, comprising:
a first bias module operable to generate a first bias to be applied to a first motor operable with a first gear;
a second bias module operable to generate a second bias, opposite the first bias, to be applied to a second motor operable with a second gear, wherein the first gear and the second gear are operably connected to a load gear, such that rotation of at least one of the first gear and the second gear causes the load gear to move; and
a command module operable to receive a drive command and output first and second command signals,
wherein the command module outputs at least one of first and second command signals based on the drive command that are summed, by a summer, with the first and second biases, respectively, to generate first and second drive signals to operate the first and second motors to drive the first and second gears, respectively, and wherein the first drive signal equals the first bias, or the second drive signal equals the second bias to bias the first gear or the second gear, respectively, in contact with the load gear during operation.

2. The anti-backlash gear control device of claim 1, wherein a negative drive command causes the command module to output the first command signal based on the drive command that is summed, by the summer, with the first bias to provide the first drive signal configured to control operation of the first motor, and wherein the negative drive command causes the second drive signal operable with the second motor to equal the second bias to bias the second gear in contact with the load gear.

3. The anti-backlash gear control device of claim 1, wherein a positive drive command causes the command module to output the second command signal based on the drive command that is summed, by the summer, with the second bias to provide the second drive signal configured to control operation of the second motor, and wherein the positive drive command causes the first drive signal operable with the first motor to equal the first bias to bias the first gear in contact with the load gear.

4. The anti-backlash gear control device of claim 1, wherein the first drive signal or the second drive signal equals the first bias or the second bias in a first operating mode, and wherein the command module simultaneously outputs the first and second command signals based on the drive command that are summed, by the summer, with the first and second biases, respectively, to simultaneously operate the first and second motors to drive the first and second gears, respectively, in a second operating mode.

5. The anti-backlash gear control device of claim 1, further comprising an input module to provide drive input for the drive command.

6. The anti-backlash gear control device of claim 1, further comprising at least one amplifier configured to amplify the first and second drive signals.

7. The anti-backlash gear control device of claim 1, wherein the command module comprises a rectifier.

8. The anti-backlash gear control device of claim 1, wherein the command module comprises a switch.

9. The anti-backlash gear control device of claim 1, wherein operation of at least one of the command module, the first bias module, and the second bias module is controlled by machine readable instructions.

10. The anti-backlash gear control device of claim 5, wherein the drive command equals the drive input.

11. The anti-backlash gear control device of claim 9, wherein the machine readable instructions control
a first operating mode,
   wherein a negative drive command causes the command module to output the first command signal based on the drive command to be summed with the first bias to provide the first drive signal configured to control operation of the first motor, and the second drive signal equals the second bias to bias the second gear in contact with the load gear, and
   wherein a positive drive command causes the command module to output the second command signal based on the drive command to be summed with the second bias to provide the second drive signal configured to control operation of the second motor, and the first drive signal equals the first bias to bias the first gear in contact with the load gear, and
a second operating mode,
   wherein the command module simultaneously outputs the first and second command signals based on the drive command that are summed, by a summer, with the first and second biases, respectively, to simultaneously operate the first and second motors to drive the first and second gears, respectively.

12. The anti-backlash gear control device of claim 10, further comprising a feedback module to provide feedback from the load gear to be summed with the drive input, wherein the drive command equals the summation of the drive input and the feedback.

13. An anti-backlash gear system, comprising:
   a first motor operable to apply torque to a first gear;
   a second motor operable to apply torque to a second gear;
   a load gear operably connected to the first gear and the second gear, such that rotation of at least one of the first gear and the second gear causes the load gear to move; and
   an anti-backlash gear control device, comprising
      a first bias module operable to generate a first bias to be applied to the first motor operable with the first gear,
      a second bias module operable to generate a second bias, opposite the first bias, to be applied to the second motor operable with the second gear, and
      a command module operable to receive a drive command and output first and second command signals,
   wherein the command module outputs at least one of first and second command signals based on the drive command that are summed, by a summer, with the first and second biases, respectively, to generate first and second drive signals to operate the first and second motors to drive the first and second gears, respectively, and
   wherein the first drive signal equals the first bias, or the second drive signal equals the second bias to bias the first gear or the second gear, respectively, in contact with the load gear during operation.

14. The anti-backlash gear control device of claim 13, wherein a negative drive command causes the command module to output the first command signal based on the drive command that is summed, by the summer, with the first bias to provide the first drive signal configured to control operation of the first motor, and wherein the negative drive command causes the second drive signal operable with the second motor to equal the second bias to bias the second gear in contact with the load gear.

15. The anti-backlash gear control device of claim 13, wherein a positive drive command causes the command module to output the second command signal based on the drive command that is summed, by the summer, with the second bias to provide the second drive signal configured to control operation of the second motor, and wherein the positive drive command causes the first drive signal operable with the first motor to equal the first bias to bias the first gear in contact with the load gear.

16. The anti-backlash gear control device of claim 13, wherein the first drive signal or the second drive signal equals the first bias or the second bias in a first operating mode, and wherein the command module simultaneously outputs the first and second command signals based on the drive command that are summed, by the summer, with the first and second biases, respectively, to simultaneously operate the first and second motors to drive the first and second gears, respectively, in a second operating mode.

17. A method for controlling backlash within a gear system, the method comprising:
   applying a first bias to a first motor operable with a first gear;
   applying a second bias, opposite the first bias, to a second motor operable with a second gear, wherein the first gear and the second gear are operably connectable to a load gear, such that rotation of at least one of the first gear and the second gear causes the load gear to move;

receiving a drive command by a command module operable to output first and second command signals;

outputting at least one of first and second command signals based on the drive command that are summed, by a summer, with the first and second biases, respectively; and generating first and second drive signals to operate the first and second motors to drive the first and second gears, respectively, wherein the first drive signal equals the first bias, or the second drive signal equals the second bias to bias the first gear or the second gear, respectively, in contact with the load gear during operation.

18. The method of claim 17, wherein a negative drive command causes outputting the first command signal based on the drive command that is summed, by the summer, with the first bias to provide the first drive signal configured to control operation of the first motor, and wherein the negative drive command causes the second drive signal operable with the second motor to equal the second bias to bias the second gear in contact with the load gear.

19. The method of claim 17, wherein a positive drive command causes outputting the second command signal based on the drive command that is summed, by the summer, with the second bias to provide the second drive signal configured to control operation of the second motor, and wherein the positive drive command causes the first drive signal operable with the first motor to equal the first bias to bias the first gear in contact with the load gear.

20. The method of claim 17, wherein the first drive signal or the second drive signal equals the first bias or the second bias in a first operating mode, and wherein simultaneously outputting the first and second command signals based on the drive command that are summed, by a summer, with the first and second biases, respectively, simultaneously operates the first and second motors to drive the first and second gears, respectively, in a second operating mode.

* * * * *